US010621032B2

(12) United States Patent
Yu

(10) Patent No.: US 10,621,032 B2
(45) Date of Patent: Apr. 14, 2020

(54) CHECKSUM TREE GENERATION FOR IMPROVED DATA ACCURACY VERIFICATION

(71) Applicant: Uber Technologies, Inc., San Francisco, CA (US)

(72) Inventor: Chia-Hao Yu, Davis, CA (US)

(73) Assignee: Uber Technologies, Inc., San Francisco, CA (US)

( * ) Notice: Subject to any disclaimer, the term of this patent is extended or adjusted under 35 U.S.C. 154(b) by 301 days.

(21) Appl. No.: 15/630,282

(22) Filed: Jun. 22, 2017

(65) Prior Publication Data

US 2018/0373585 A1 Dec. 27, 2018

(51) Int. Cl.
*G06F 11/10* (2006.01)
*G06F 16/22* (2019.01)
*G06F 16/901* (2019.01)

(52) U.S. Cl.
CPC ...... *G06F 11/1004* (2013.01); *G06F 16/2246* (2019.01); *G06F 16/9027* (2019.01)

(58) Field of Classification Search
CPC ............ G06F 16/2246; G06F 11/1004; G06F 16/9027
See application file for complete search history.

(56) References Cited

U.S. PATENT DOCUMENTS

| | | | | |
|---|---|---|---|---|
| 8,706,701 | B1* | 4/2014 | Stefanov | G06F 21/64 707/687 |
| 10,116,450 | B1* | 10/2018 | Brown | H04L 9/3247 |
| 10,152,481 | B1* | 12/2018 | Singh | G06F 16/122 |
| 2005/0267902 | A1* | 12/2005 | Thurnhofer | G06F 16/2246 |
| 2006/0242145 | A1* | 10/2006 | Krishnamurthy | G06F 17/2211 |
| 2007/0016441 | A1* | 1/2007 | Stroup | G06Q 10/10 705/2 |
| 2011/0191633 | A1* | 8/2011 | Archer | G06F 11/263 714/32 |
| 2016/0217044 | A1* | 7/2016 | Bailey | G06F 11/1451 |
| 2016/0253500 | A1* | 9/2016 | Alme | H05K 999/99 726/23 |
| 2016/0328165 | A1* | 11/2016 | Bushman | G06F 16/113 |
| 2018/0300350 | A1* | 10/2018 | Mainali | G06F 16/134 |
| 2018/0329785 | A1* | 11/2018 | Mosek | G06F 11/1464 |

OTHER PUBLICATIONS

Pang et al., "Authenticating Query Results in Edge Computing", 2004, IEEE. (Year: 2004).*

* cited by examiner

*Primary Examiner* — Etienne P Leroux
*Assistant Examiner* — Sheryl L Holland
(74) *Attorney, Agent, or Firm* — Fenwick & West LLP

(57) ABSTRACT

A data management system verifies the accuracy of data retrieved from a primary data store using a checksum tree stored by a secondary data store. A checksum tree is a tree graph that represents a hierarchy of checksums. Leaf nodes of the checksum tree can store checksums for data blocks stored by the primary data store and secondary data store, and parent nodes can represent checksums of their respective child nodes. The data management system can compare reference subtrees within the checksum tree to comparison subtrees that are generated from data retrieved from the primary data store to determine whether the retrieved data is accurate. The data management system can also use the checksum tree to identify which, if any, of the retrieved data blocks are inaccurate.

20 Claims, 8 Drawing Sheets

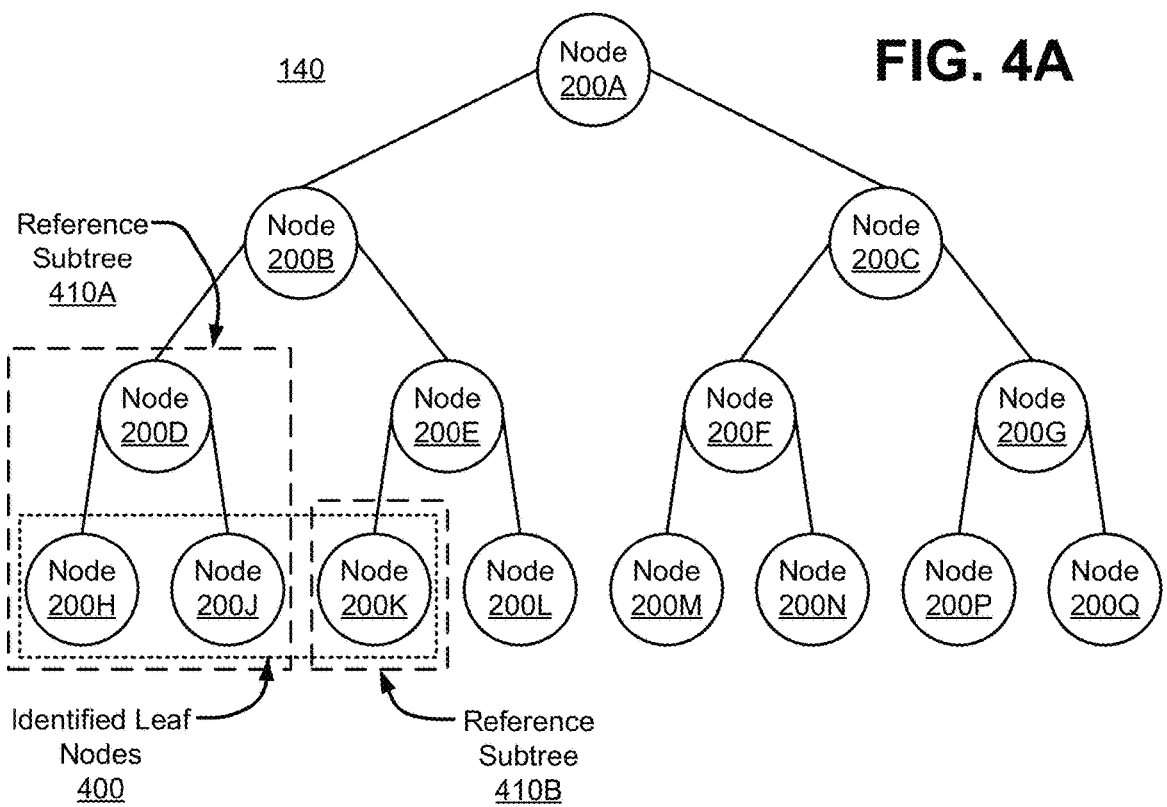
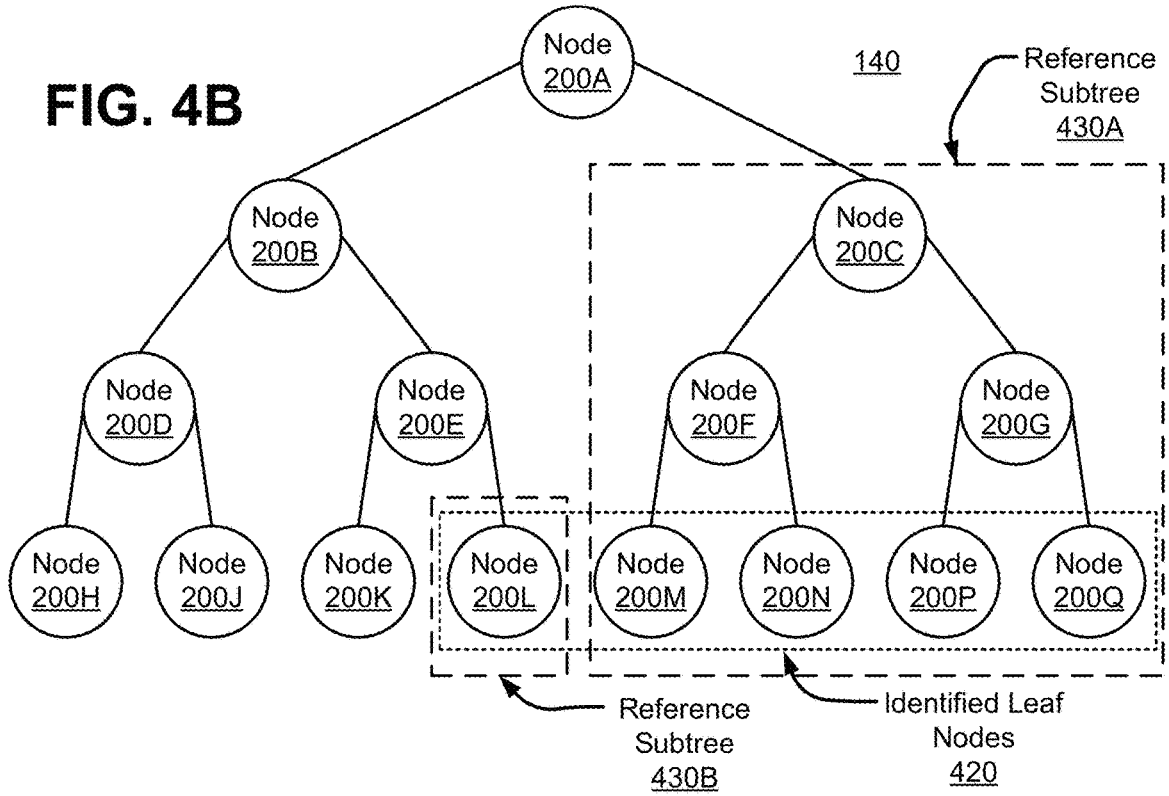

CHECKSUM TREE GENERATION FOR IMPROVED DATA ACCURACY VERIFICATION

BACKGROUND

Field of Art

The present disclosure relates generally to validating storage system contents, and more particularly to identifying data inconsistencies between storage systems.

Description of Art

Large and complex data storage solutions may store the same data at more than one data store. Due to the nature of these systems, the stored data at each location may differ over time, resulting in discrepancies between the storage systems. These differences may occur, for example, due to data degradation or physical system errors. These data stores may also differ in the capabilities provided for accessing the data. For example, one data store may be more reliable while another data store provides higher throughput for the data. Typically, data stores provide robust and reliable data retrieval or provide high throughput to retrieve a large amount of data simultaneously. Thus, more robust systems may provide a lower throughput. To effectively use multiple data storage systems, data differences between the systems must be effectively and quickly identified and resolved.

SUMMARY

A data management system verifies whether data retrieved from a primary data store matches data stored in a secondary data store using a checksum tree. When retrieving data for the primary data store, a checksum tree may be calculated for the primary data store and compared with the relevant portions of the checksum tree for the secondary data store. This may permit efficient verification of the primary data store without requiring direct comparison with the data of the secondary data store. A checksum tree is a tree graph that represents a hierarchy of checksums. Leaf nodes of the checksum tree can store checksums for stored data blocks and parent nodes can represent checksums of their respective child nodes. To verify the accuracy of data blocks retrieved from the primary data store, the data management system identifies leaf nodes of the checksum tree that contain checksums for data blocks requested by a client device. The data management system then identifies one or more reference subtrees within the checksum tree that contain the identified leaf nodes. For example, the data management system may identify a common ancestor subtree or an exclusive subtree as a reference subtree for the data blocks. A common ancestor subtree is a reference subtree whose root node is the lowest node that is an ancestor of all of the identified leaf nodes. An exclusive subtree is a subtree whose leaves contain exclusively the identified leaf nodes.

The data management system receives the requested data blocks from the primary data store, as well as any additional data blocks needed to generate one or more comparison subtrees. A comparison subtree contains nodes that correspond to a reference subtree identified for a data request. The comparison subtree thus differs from the reference subtree when the comparison subtree includes data blocks from the primary data store that differ from the corresponding blocks in the secondary data store. To determine whether the retrieved data blocks differ from the data blocks stored by the secondary data store, the data management system compares the checksums in the comparison subtree with checksums in the corresponding reference subtree. For example, the data management system may compare the root node of the reference subtree with the root node of the comparison subtree. If the root node checksum of the comparison subtree matches the root node checksum of the reference subtree, the data management system determines that the retrieved data blocks are accurate with respect to the data at the secondary data storage. If the root node checksums do not match, the data management system determines that at least one of the retrieved data blocks is not accurate.

If the data management system determines that the retrieved data blocks are not accurate with respect to the secondary data store, the data management system can identify which data blocks are inaccurate using the comparison subtree. For example, the data management can compare the child nodes of the comparison subtree root node to their respective nodes in the reference tree. If a child node checksum for the comparison subtree matches its respective checksum in the reference subtree, the data management system determines that the data blocks corresponding to descendent leaf nodes for the child node are accurate. If the child node checksum of the comparison tree does not match its respective node, the data management system can traverse the comparison subtree to identify leaf nodes that do not contain checksums that match their respective checksums in the reference subtree. If a leaf node checksum does not match its respective checksum in the reference subtree, the data management system determines that the data block corresponding to the leaf node is inaccurate.

By using a checksum tree to verify the accuracy of data blocks retrieved from a primary data store with respect to the secondary data store, the data management system can improve the efficiency of accurate data retrieval for a client device. First, since the data management system can simply compare the root node checksums of a comparison subtree and a reference subtree to determine whether data blocks are accurate, the data management system does not need to perform multiple checksum comparisons to determine the accuracy of multiple checksums. Additionally, the data management system can more effectively identify which data blocks are inaccurate because the data management system can eliminate descendants of a node of the comparison subtree as accurate if the checksum of the node is correct.

Furthermore, the data management system can more easily determine the accuracy of data retrieved from a primary data store that is optimized for high throughput. The data management system can efficiently compare the comparison subtree to the reference subtree of the checksum tree stored by the more accurate secondary data store, thereby ensuring high throughput by primarily retrieving data from the high throughput data store and high accuracy by verifying that data with the reference tree of the secondary data store.

BRIEF DESCRIPTION OF THE DRAWINGS

FIGS. 4A and 4B illustrate example reference exclusive subtrees, in accordance with some embodiments.

DETAILED DESCRIPTION

Example System Environment and Architecture

Figure 1:
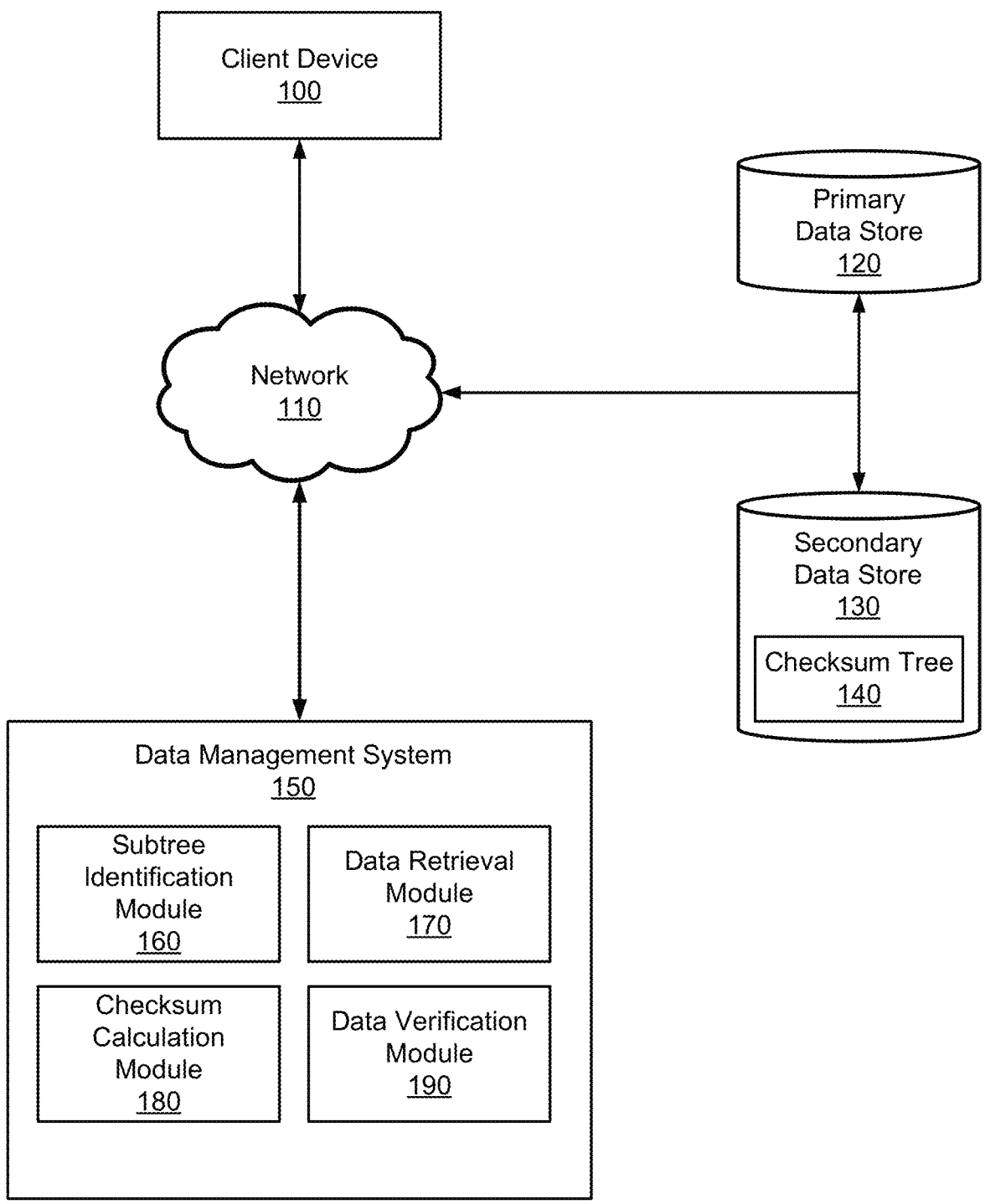
FIG. 1 illustrates an example system environment and architecture for a data management system, in accordance with some embodiments.

FIG. 1 illustrates an example system environment and architecture for a data management system 150, in accordance with some embodiments. The illustrated system environment includes a client device 100, a network 110, and a primary data store 120, a secondary data store 130, and the data management system 150. In alternate embodiments, the functionality of each component may be distributed differently from the examples described herein, and the system environment may include more, fewer, or different components than illustrated in FIG. 1. For example, the system environment may include multiple client devices 100 in communication with the data management system 150. Additionally, each component may perform their respective functionalities in response to a request from a human, or automatically without human intervention.

A user can interact with the data management system 150 through a client device 100. The client device 100 can be a personal or mobile computing device, such as a smartphone, a tablet, a laptop computer, or desktop computer. In some embodiments, the client device 100 executes a client application that uses an application programming interface (API) to communicate with the data management system 150 through the network 110. The client device 100 requests data from the data management system 150 by generating a data request and transmitting the data request to the data management system 150. The data request includes data parameters that specify what data the user is requesting. The data parameters may include parameters used to organize data stored by the primary data store 120 and the secondary data store 130, and may specify parameter values that can be used by the data management system 150 to identify data blocks that store the requested data. For example, the data parameters may specify one or more ranges of parameters used to organize data in data blocks, and the ranges may be used by the data management system 150 to identify which data blocks store the requested data. Example parameters to organize data include timestamps, geographic locations, and user identifiers. In some embodiments, the data parameters include one or more identifiers that directly identify data blocks to be transmitted to the client device 100. The data request may further include an identifier for client device 100 or for the user associated with the client device 100.

The network 110 allows the client device 100, the primary data store 120, the secondary data store 130, and the data management system 150 to communicate. The network may include any combination of local area and wide area networks employing wired or wireless communication links. In some embodiments, the network 110 uses standard communications technologies and protocols. For example, the network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 110 may be represented using any format, such as hypertext markup language (HTML) or extensible markup language (XML). In some embodiments, all or some of the communication links of the network 110 may be encrypted.

The primary data store 120 stores data to be provided to the client device 100 through the data management system 150. The primary data store 120 stores data within one or more servers to provide data for data requests from one or more client devices 100 querying the data management system 150. The primary data store 120 organizes data into data blocks, where each data block contains a set of data having a unique specified set of properties. The data blocks may be organized data parameters for data stored in the primary data store 120. For example, the data blocks may be organized based on timestamps of the data contained by the data blocks, types of the data stored in the data blocks, two-dimensional and three-dimensional location metadata, or a user identifier for a user who generated the data. In some embodiments, each data block contains data that corresponds to a range of data parameters used to organize data. For example, each data block may be associated with a range of timestamps associated with the data stored in the block. The primary data store 120 can receive new data from the client device 100 or the data management system 150 and can organize the new data into new data blocks. In some embodiments, the primary data store 120 transmits any new data to the secondary data store 130 for storage.

The secondary data store 130 stores the same data as the primary data store 120, is updated with new data when the new data is written to the primary data store 120, and organizes data using the same data blocks as the primary data store 120. In some embodiments, the secondary data store 130 is an additional data store to the primary data store 120 with similar capabilities. The secondary data store alternatively may be optimized for data consistency and invariance, whereas the primary data store 120 may be optimized for high throughput.

Figure 2:
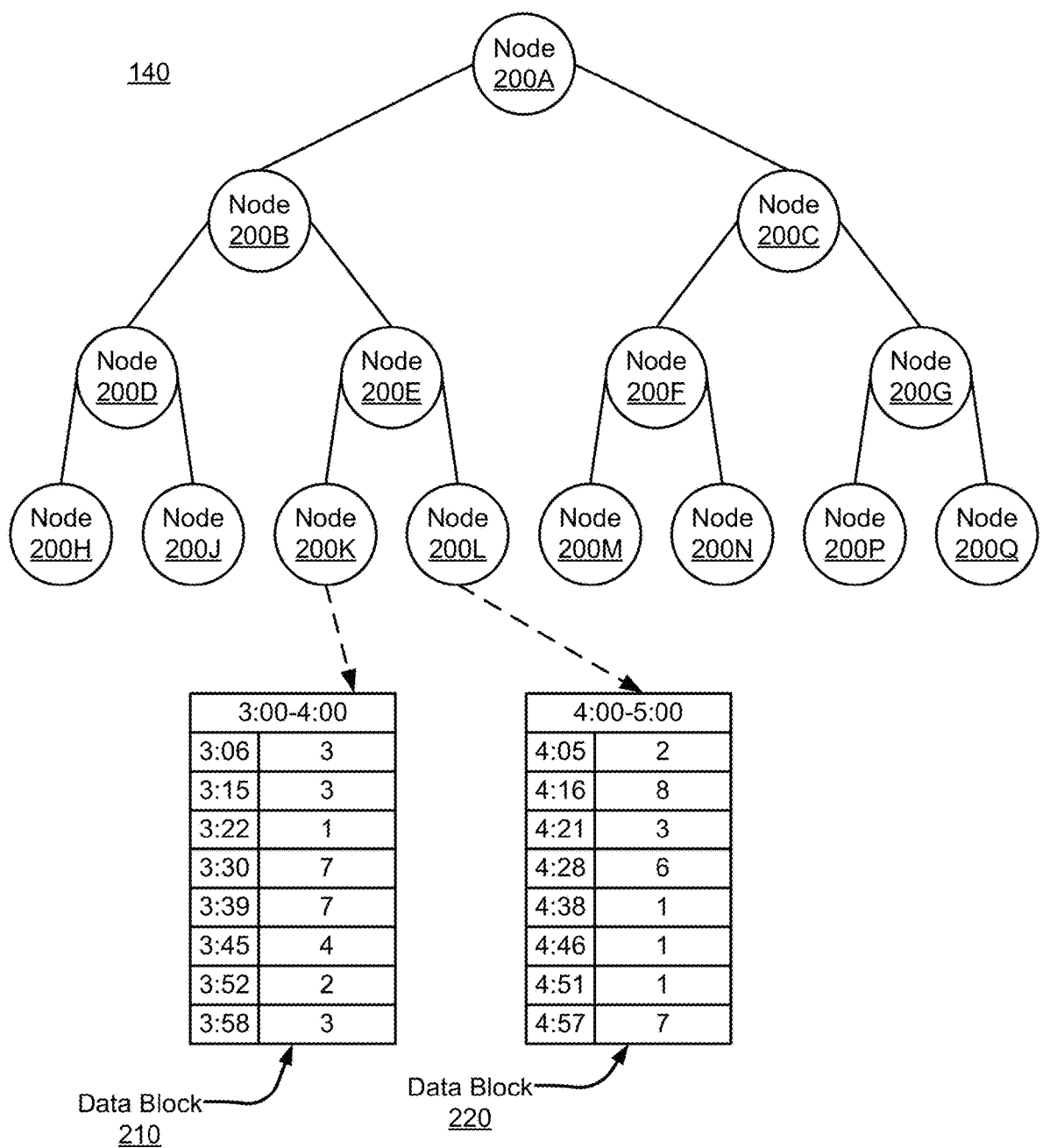
FIG. 2 illustrates an example checksum tree stored by the secondary data store, in accordance with some embodiments.

The secondary data store 130 stores a checksum tree 140 for the data stored in the secondary data store 130. The checksum tree 140 is a tree graph that stores a hierarchy of checksums for the data stored by the secondary data store 130. FIG. 2 illustrates an example checksum tree 140 stored by the secondary data store 130, in accordance with some embodiments. The checksum tree 140 includes a plurality of checksum nodes 200, each of which stores a checksum. A checksum is one or more values that are used to detect errors in larger sets of data. A checksum can be compared to another checksum to more quickly determine whether discrepancies exist between the two larger sets of data that the checksums represent than by comparing the large sets of data to each other directly. Checksums can be calculated using hashing functions that are preferably collision-resistant (i.e., different data blocks are unlikely to correspond to the same checksum value). Thus, data blocks from the primary data store 120 and corresponding data blocks from the secondary data store 130 are unlikely to have the same checksum if the data in the data blocks do not match. Example algorithms for generating a checksum from a set of data include parity bytes, modular sums, Fletcher's checksum, Adler-32, MD5, SHA-1, SHA-256, SHA-384, SHA-512, and cyclic redundancy checks. When the secondary data store 130 receives new data, the secondary data store 130 may generate a new data block to contain the new data and insert a new checksum node into the checksum tree 140 that contains a checksum for the new data block. The secondary data store 130 may insert the new node such that the checksum tree 140 remains balanced (i.e., the distances of the leaf nodes of the checksum trees to the root node remain similar). In some embodiments, the checksum tree 140 is a self-balancing tree. The leaf checksum nodes 200H-200Q each store a checksum for a block of data stored by the primary data store 120 and the secondary data store 130. For example, checksum node 200K stores a checksum for data block 210, and checksum node 200L stores a checksum for data block 220.

In the embodiment illustrated in FIG. 2, the data blocks stored by the primary data store 120 and the secondary data store 130 store data with a particular time period. For example, data block 210 stores data collected from time 3:00 to time 4:00, and data block 220 stores data collected from time 4:00 to time 5:00. However, as explained above, data blocks may organize data based on other parameters, such as users associated with the stored data or the type of data being stored.

A parent checksum node is associated with one or more child checksum nodes, and stores a checksum of the checksums stored by their respective child nodes. For example, checksum node 200D stores a checksum of node 200H and node 200J, checksum node 200B stores a checksum of node 200D and node 200E, and checksum node 200A stores a checksum of node 200B and node 200C. Thus, the root checksum node 200 of the checksum tree 140 (e.g. checksum node 200A) may store a checksum for all of the data blocks stored by the primary data store 120 and the secondary data store 130. The checksums for parent nodes may be calculated using a different checksum algorithm than the checksums for leaf nodes. Additionally, in some embodiments, if the data blocks are organized based on parameters of the data (e.g., timestamps for when new data is added), a parent node checksum represents a checksum for data within for a set of data blocks within a particular range of that parameter. For example, node 200E represents a checksum for data blocks containing data from time 3:00 to time 5:00.

The data management system 150 services data requests from the client device 100 by providing data from the primary data store 120 that has been verified using the checksum tree 140 stored by the secondary data store 130. The data management system compares checksums stored in the checksum tree 140 to the checksums in comparison subtrees generated from data retrieved from the primary data store 120. By comparing the comparison subtrees with checksums in the checksum tree, the data management system 150 can verify the accuracy of the data being retrieved from the primary data store 120, i.e. ensure that the retrieved data remains consistent and invariant with respect to the secondary data store 130 as data is added or updated in the primary data store 120.

FIG. 1 illustrates an example system architecture for a data management system 150, in accordance with some embodiments. The data management system 150 illustrated in FIG. 1 includes a subtree identification module 160, a data retrieval module 170, a checksum calculation module 180, and a data verification module 190. Alternate embodiments my include more, fewer, or different components from those illustrated in FIG. 1, and the functionality of each component may be divided between the components differently from the description below. Additionally, each component may perform their respective functionalities in response to a request from a human, or automatically without human intervention.

When the data management system 150 receives a data request from the client device 100, the subtree identification module 160 identifies one or more reference subtrees within the checksum tree 140. A reference subtree is a subtree of the checksum tree 140 whose nodes can be used to verify the accuracy of data requested by a data request. To identify the one or more reference subtrees for a data request, the subtree identification module 160 identifies leaf nodes in the checksum tree 140 whose checksums correspond to the data blocks identified in the data request. For example, if the data request requests data from data block 210 and data block 220, the subtree identification module 160 would identify leaf node 200K and leaf node 200L as containing checksums for those data blocks. The subtree identification module 160 identifies one or more reference subtrees whose leaf nodes include the identified leaf nodes. For example, if the subtree identification module 160 identifies leaf node 200K and leaf node 200L, the subtree identification module 160 may identify the subtree whose root node is checksum node 200E as a reference subtree for the data request. In some embodiments, the subtree identification module 160 identifies the "common ancestor subtree" as a reference subtree for the data request. The common ancestor subtree is a subtree whose root node is the lowest (i.e., furthest from the root node of the checksum tree 140) node that is an ancestor of all of the identified leaf nodes for the data request.

Figure 3A:
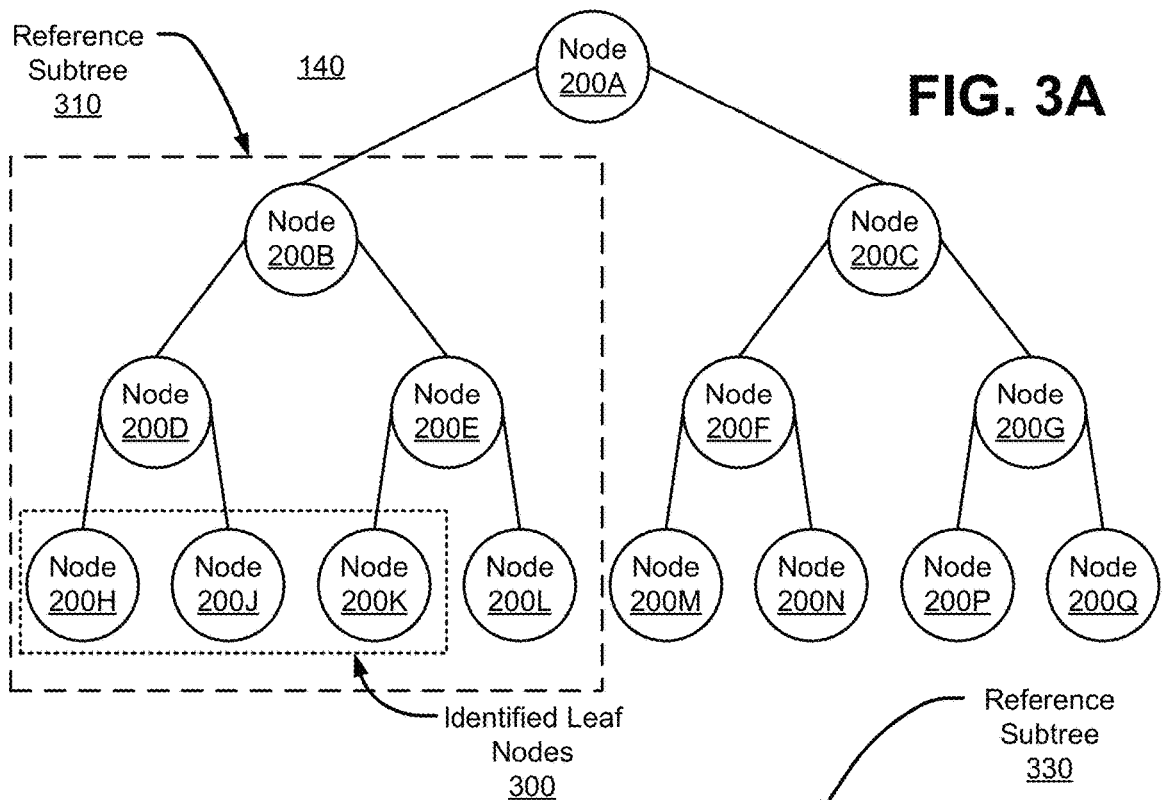
FIGS. 3A and 3B illustrate example reference common ancestor subtrees, in accordance with some embodiments.
Figure 3B:
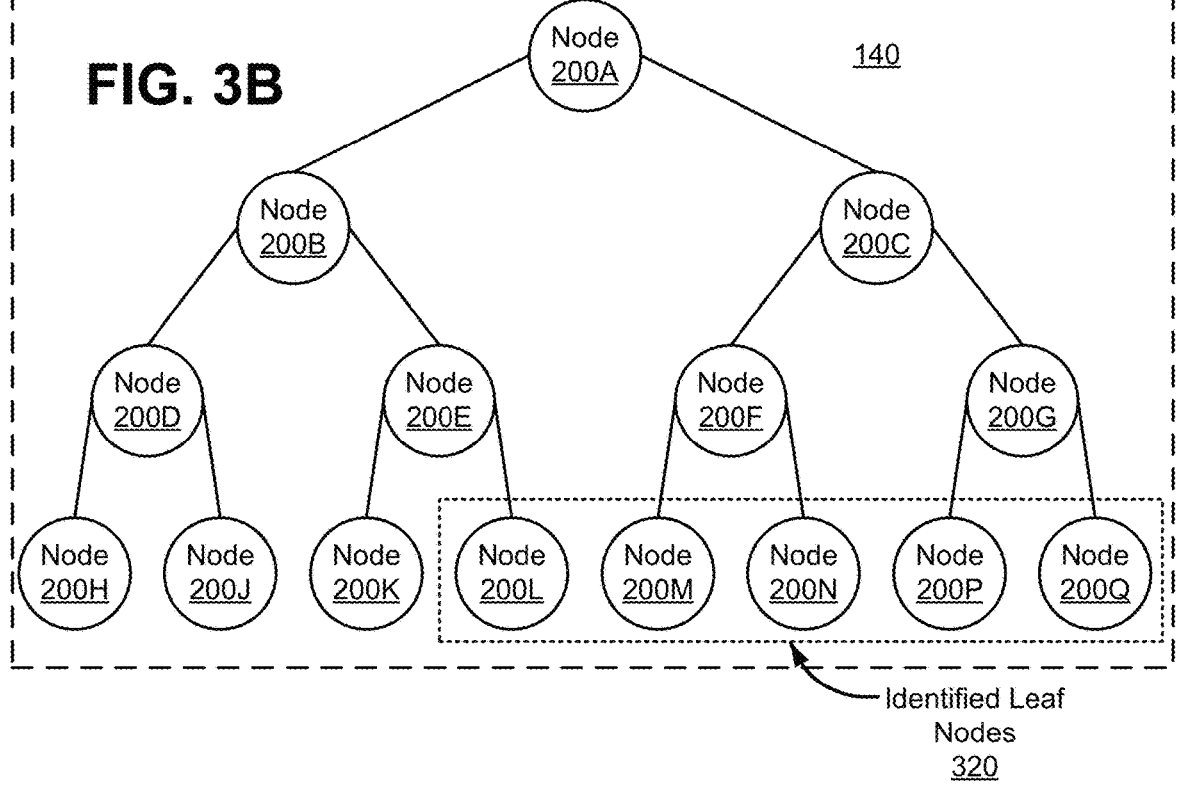

FIGS. 3A and 3B illustrate example reference common ancestor subtrees, in accordance with some embodiments. In the embodiment illustrated in FIG. 3A, the subtree identification module 160 identifies three leaf nodes 300 as storing checksums for data blocks requested by a data request: nodes 200H, 200J, and 200K. The lowest node that is a common ancestor to nodes 200H-200K is node 200B, and therefore the subtree identification module 160 can identify a reference subtree 310 of the checksum tree 140 wherein node 200B is the root node. Similarly, in the embodiment illustrated in FIG. 3B, the subtree identification module 160 identifies five leaf nodes 320 as storing checksums for data blocks requested by a data request: nodes 200L, 200M, 200N, 200P, and 200Q. The lowest node that is a common ancestor to nodes 200L-200Q is node 200A, and therefore the subtree identification module may identify the entire checksum tree as a reference subtree 330. The subtree identification module 160 also may identify one or more "exclusive subtrees" as reference subtrees for the data request. An exclusive subtree is a subtree whose leaves contain exclusively leaf nodes identified by the subtree identification module 160 for a data request.

FIGS. 4A and 4B illustrate example reference exclusive subtrees, in accordance with some embodiments. In the embodiment illustrated in FIG. 4A, the subtree identification module 160 identifies three leaf nodes 400 as storing checksums for data blocks requested by a data request: nodes 200H, 200J, and 200K. The subtree identification module 160 may identify subtree 410A and subtree 410B as reference subtrees, for the leaf nodes of these subtrees 410 exclusively include the identified leaf nodes 400. Similarly, in the embodiment illustrated in FIG. 4B, the subtree identification module 160 identifies five leaf nodes 420 as storing checksums for data blocks requested by a data request: nodes 200L, 200M, 200N, 200P, and 200Q. The subtree identification module 160 identifies subtree 430A and subtree 430B as reference subtrees, for the leaf nodes of these subtrees 430 exclusively include the identified leaf nodes 420. In some embodiments, the subtree identification module 160 identifies the largest exclusive subtrees as reference subtrees.

The data retrieval module 170 retrieves data requested by a client device 100 from the primary data store 120. As explained above, a data request may specify data blocks to be collected from the primary data store 120, and the data retrieval module 170 retrieves the specified data blocks from the primary data store 120. In some embodiments, the data retrieval module 170 collects data blocks corresponding to leaf nodes of comparison subtrees identified by the subtree identification module 160 for a data request. For example, for subtree 310 identified in FIG. 3A, the data retrieval module 170 retrieves data blocks corresponding to the checksums stored in nodes 200H-200L. Similarly, for subtrees 430 identified in FIG. 4B, the data retrieval module 170 retrieves data blocks corresponding to checksums stored in nodes 200L-200Q.

Figure 5:
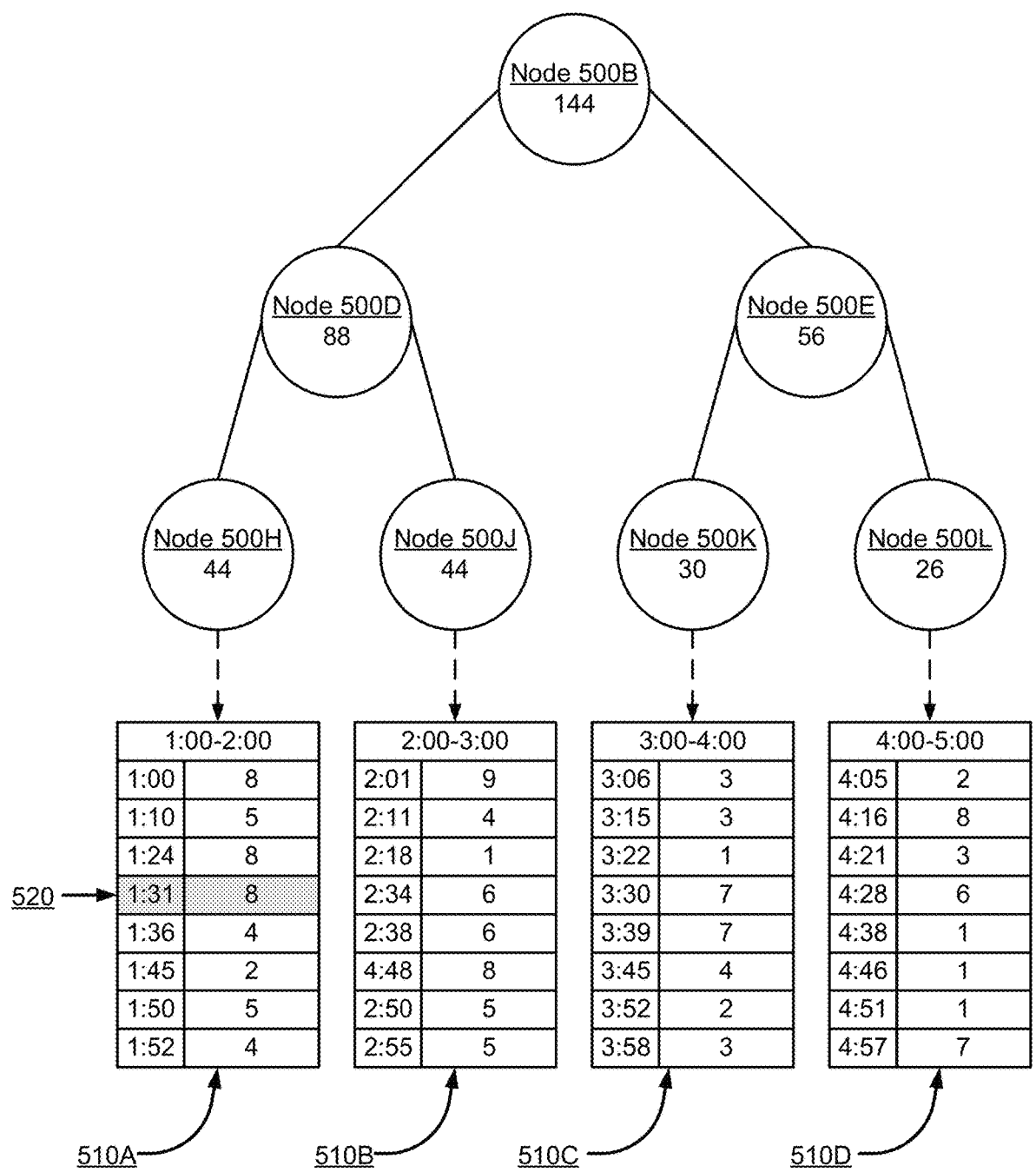
FIG. 5 illustrates an example comparison checksum subtree, in accordance with some embodiments.

The checksum calculation module 180 calculates checksums based on data retrieved by the data retrieval module 170 to generate the comparison checksum subtrees identified by the subtree identification module 160. A reference subtree is a subtree generated based on data blocks retrieved from the primary data store 120. The nodes of a comparison subtree correspond to nodes of reference subtrees identified by the subtree identification module 160. FIG. 5 illustrates an example comparison checksum subtree, in accordance with some embodiments. The comparison subtree illustrated in FIG. 5 corresponds to the reference subtree identified in FIG. 3A. The nodes of the comparison subtree (nodes 500B, 500D, 500E, and 500H-500L) correspond to the nodes of the identified subtree of the checksum tree 140 (nodes 200B, 200D, 200E, and 200H-200L). The data retrieval module 170 retrieves the data blocks identified in the data request from the primary data store 120: data blocks 510A-510C. The data retrieval module 170 also retrieves data block 510D, because data block 510D corresponds to the checksum in leaf node 200L of the comparison subtree 310. The checksum calculation module 180 generates checksums for the leaf nodes of comparison subtrees using the corresponding data blocks. For FIG. 5, the checksum calculation module 180 computes the checksums for leaf nodes 500H-500L using data blocks 510A-510D, respectively. The checksums for leaf nodes 500H-500L are simply the sums of the data stored in the respective data blocks, though more sophisticated checksum algorithms may be used in alternate embodiments. The checksum calculation module 180 computes the checksums of parent checksum nodes based on the checksums of their respective child nodes. For example, in FIG. 5, the checksum for node 500D is based on the checksums of nodes 500H and 500J, the checksum for node 500E is based on the checksums of nodes 500K and 500L, and the checksum for node 500B is based on the checksums of nodes 500D and 500E. In the embodiment illustrated in FIG. 5, the checksums of the parent nodes are the sums of the checksums of their respective child nodes, though in alternate embodiments, different algorithms may be used. Additionally, the checksum algorithm used for the parent nodes may be different from the checksum algorithm used for the leaf nodes.

The checksum calculation module 180 generates the comparison subtree based on the data blocks retrieved by the data retrieval module 170 from the primary data store 120. However, as explained above, the data blocks stored in the primary data store 120 may be incorrect due to data consistency or other issues with the primary data store 120. Therefore, the data blocks retrieved by the data retrieval module 170 may be erroneous. For example, data block 510A contains an error 520, for the 1:31 value in data block 510A should be "3" and not "8." This error is reflected in the checksum calculated for node 500H.

The data verification module 190 verifies the accuracy of data retrieved by the data retrieval module 170. The data verification module 190 compares checksums stored within comparison subtrees to the corresponding checksums stored in the reference subtrees of the checksum tree 140. The data verification module 190 first compares the checksum of the comparison subtree's root node with the checksum of the reference subtree root node. If the root node checksums are the equal, then the data verification module 190 determines that the data blocks associated with the leaf nodes of the comparison subtree are accurate with respect to the secondary data store 130. If the root node checksums are different, then the data verification module 190 determines that the leaf node data blocks are not accurate with respect to the secondary data store 130.

Figure 6:
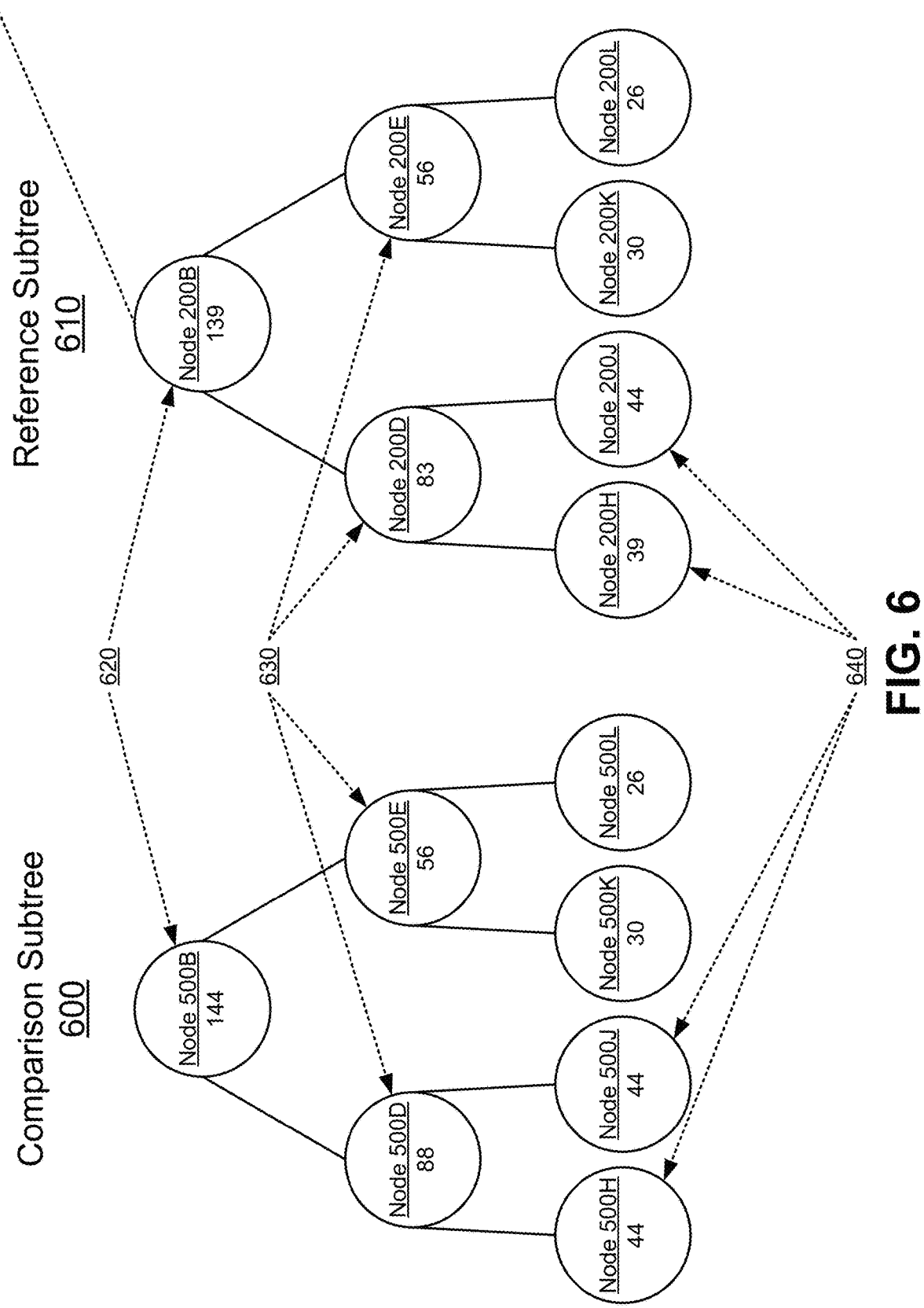
FIG. 6 illustrates the comparison of checksums in a comparison subtree with a reference subtree, in accordance with some embodiments.

FIG. 6 illustrates the comparison of checksums in a comparison subtree 600 with a reference subtree 610, in accordance with some embodiments. The comparison subtree 600 was generated using data retrieved from the primary data store 120, and the reference subtree 610 is an identified subtree of the checksum tree 140 containing leaf nodes associated with data blocks requested by a data request. To determine whether the data blocks corresponding to the leaf nodes 500H-500L are accurate, the data verification module 190 compares 620 the root node 500B of the comparison subtree 600 with the root node 200B of the checksum subtree 610. Since the checksum of node 500B is different from the checksum of node 200B, the data verification module 190 determines that at least one of the data blocks associated with leaf nodes 500H-500L is inaccurate.

If the data verification module 190 determines that at least one of the retrieved data blocks are not accurate with respect to the secondary data store 130, then the data verification module 190 can identify which of the leaf node data blocks are inaccurate. The data verification module 190 identifies the inaccurate data blocks by traversing down the comparison subtree from the root node and identifying nodes within the comparison subtree that do not match their corresponding nodes in the reference subtree. If, while traversing down a comparison subtree, the data verification module 190 identifies a node that matches its corresponding node in the checksum tree 140, the data verification module 190 determines that all descendent leaf nodes of the identified node have accurate checksums, and the data verification module 190 does not review the accuracy of the identified node's descendants. If the data verification module 190 identifies a node that does not match its corresponding node in the checksum tree 140, the data verification module 190 reviews the child nodes of the identified node.

In the embodiment illustrated by FIG. 6, after determining that the checksum of node 500B is incorrect, the data verification module 190 reviews the accuracy of node 500B's child nodes. The data verification module 190 compares 630 node 500D to node 200D of the reference subtree and node 500E to node 200E. Since the checksum of node 500E is equal to the checksum of node 200E, the data verification module 190 determines that the checksums of node 500D's descendants are accurate, and thus does not review nodes 500K and 500L. Since the checksum of node 500D is different from the checksum of node 200D, the data verification module 190 reviews nodes 500H and 500J to see if their checksums are accurate. The data verification module 190 compares 640 node 500H to node 200H of the reference subtree and node 500J to node 200J. Since the checksum of node 500J is equal to the checksum of node 200J, the data verification module 190 determines that the data block associated with node 500J is accurate. Since the checksum of node 500H is different from the checksum of node 200H, the data verification module 190 determines that the data block associated with node 500H is inaccurate.

The data verification module 190 traverses the comparison subtrees generated by the checksum calculation module 180 and identifies the data blocks retrieved by the data retrieval module 170 that are inaccurate with respect to the secondary data store 130. If the data verification module 190 determines that the data blocks are accurate, the data verification module 190 transmits the retrieved data block to the client device 100. If the data verification module 190 determines that one or more of the retrieved data blocks is inaccurate, the data verification module 190 may notify an operator of the data management system 150 that the identified data blocks are inaccurate. In some embodiments, the data verification module 190 corrects the data blocks that are determined to be inaccurate. For example, the data retrieval module 190 may retrieve accurate data blocks from the secondary data store 130 and may transmit the accurate data blocks to the client device 100. The data retrieval module 190 may also update the primary data store 120 with the correct data blocks. In some embodiments, discrepancies between the primary data store 120 and the secondary data store 130 are resolved using data from other data stores that may also store the data stored by the primary data store 120 and the secondary data store 130. For example, if a tertiary data store is also used to store the data stored by the primary data store 120 and the secondary data store 130, discrepancies between the primary data store 120 and the secondary data store 130 may be resolved using the tertiary data store (e.g., by correcting the data to what is stored by the majority of the data stores).

Determining the Accuracy of Data Blocks Using a Checksum Tree

Figure 7:
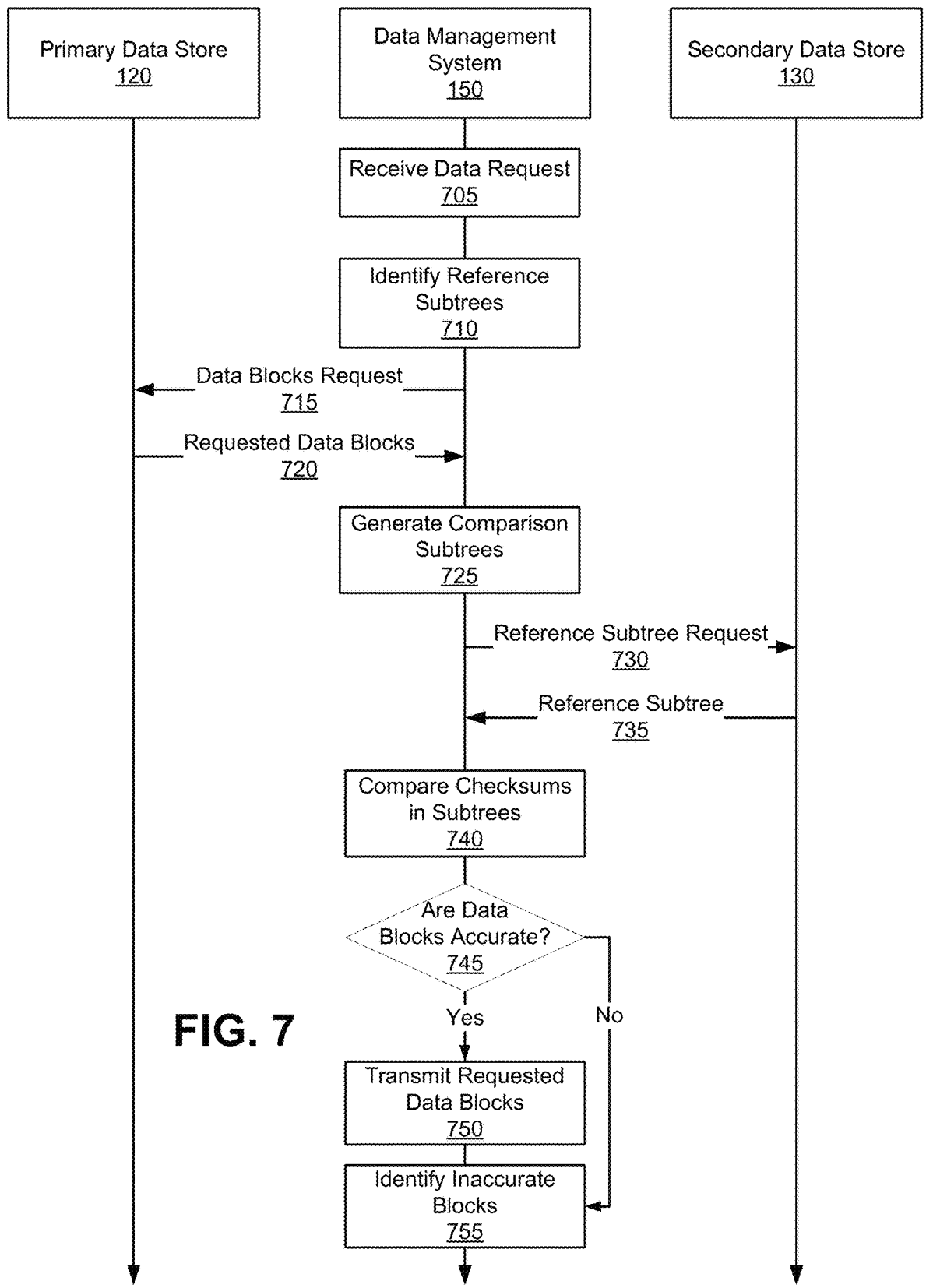
FIG. 7 is a sequence diagram for a method of determining the accuracy of data blocks using a checksum tree, in accordance with some embodiments.

FIG. 7 is a sequence diagram for a method of determining the accuracy of data blocks using a checksum tree, in accordance with some embodiments. Alternate embodiments may include more, fewer, or different steps from those illustrated in FIG. 7, and the steps may be performed in a different order from that illustrated in FIG. 7. Additionally, each of these steps may be performed automatically by the data management system 150 without human intervention.

The data management system 150 receives a data request 705 from a client device. The data request can include identifiers for data blocks requested by the client device. The identifiers may identify the data blocks directly, or may specify a range of a parameter used by the primary data store 120 and the secondary data store 130 to organize the data blocks. The data management system 150 identifies a reference subtree 710 for the data request. The reference subtree is a subtree within the checksum tree stored by the secondary data store 130, and includes one or more leaf nodes that store checksums for the requested data blocks. In some embodiments, the data management system 150 identifies a common ancestor subtree for the requested data blocks. The data management system 150 also may identify one or more exclusive subtrees.

The data management system 150 transmits a request to the primary data store 120 for the requested data blocks 715 and receives the requested data blocks 720 from the primary data store 120. In some embodiments, the data management system 150 requests additional data blocks from the primary data store 120 to generate comparison subtrees.

The data management system 150 generates 725 comparison subtrees using the data blocks 720 received from the primary data store 120. The data management system 150 can generate the comparison subtree by calculating checksums for the nodes of the comparison subtrees. For example, the data management system 150 may calculate checksums for each of the data blocks received from the primary data store 120 for the leaf nodes of the comparison subtree, and may generate checksums for parent nodes of the comparison subtree based on checksums of child nodes.

The data management system 150 transmits a request for a reference subtree 730 to the secondary data store 130. The request may identify the reference subtree that corresponds to the generated checksum subtree. The secondary data store 130 transmits the reference subtree 735 to the data management system 150 that correspond to the generated comparison subtree. The data management system 150 compares the checksums of the reference subtree 740 with the checksums in the generated comparison subtree and determines whether received data blocks are accurate 745 with respect to the secondary data store 130 based on the comparison. The data management system 150 may compare the checksum of the comparison subtree's root node to the checksum of the reference subtree's root node. If the checksums are equal, the data management system 150 determines that the data blocks retrieved from the primary data store 120 are accurate. If the checksums are different, the data management system 150 determines that the data blocks are inaccurate.

If the data blocks are accurate, the data management system 150 transmits the requested data blocks 750 to the client device. If the data blocks are inaccurate, the data management system 150 may identify which data blocks retrieved from the primary data store 120 are inaccurate 755. The data management system 150 identifies which data blocks are inaccurate by traversing the generated comparison subtree and comparing the nodes of the comparison subtree to corresponding nodes in the reference subtree. The data management system 150 may notify an operator of the data management system 150 that the data blocks are inaccurate, or may replace the inaccurate data blocks retrieved from the primary data store 120 with data block retrieved from the secondary data store 130.

Example Machine Architecture

Figure 8:
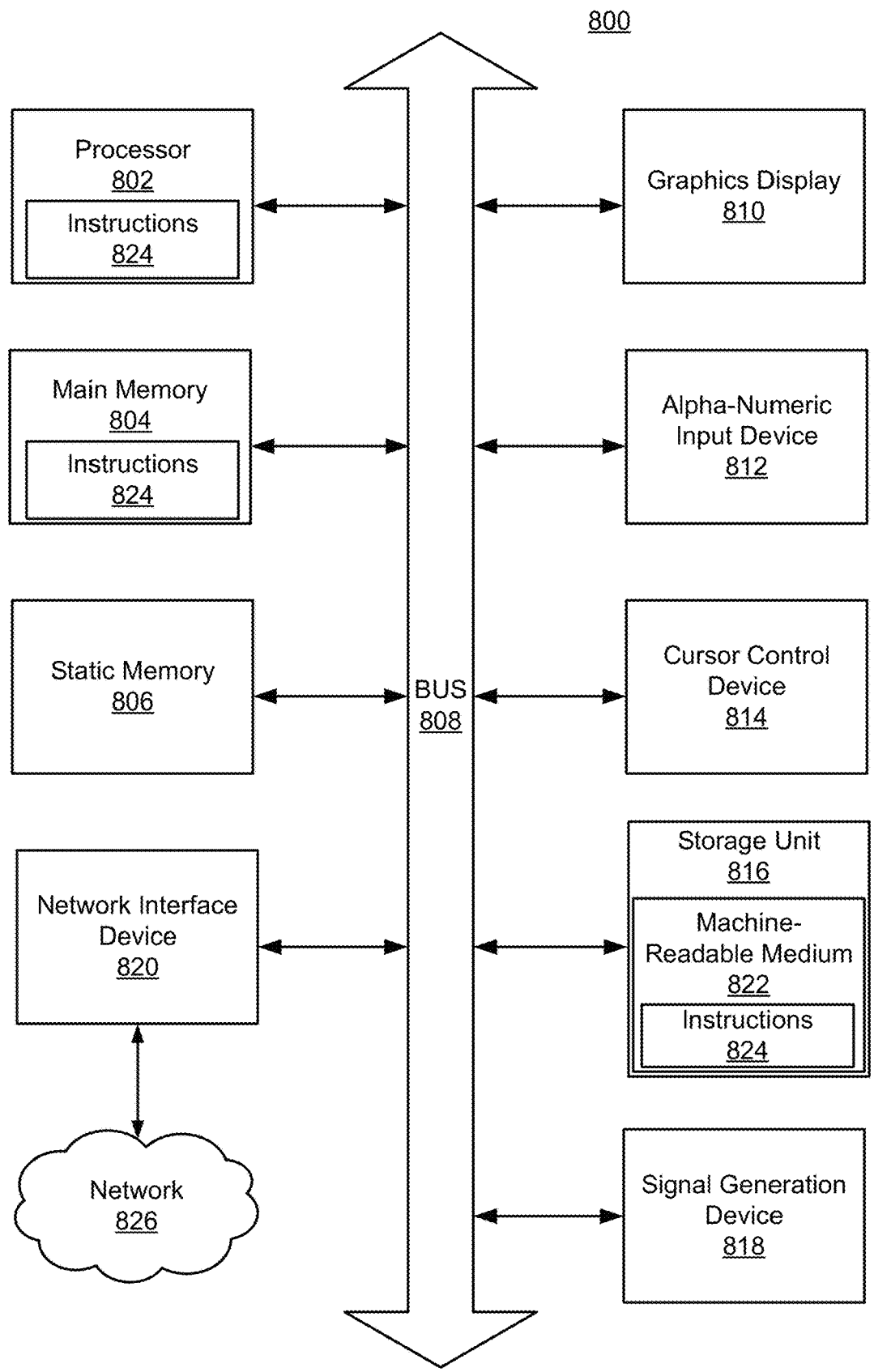
FIG. 8 is a block diagram illustrating components of an example machine able to read instructions from a machine-readable medium and execute them in a processor (or controller).

FIG. 8 is a block diagram illustrating components of an example machine able to read instructions from a machine-readable medium and execute them in a processor (or controller). Specifically, FIG. 8 shows a diagrammatic representation of a machine in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a display driver 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 via the network interface device 820.

While machine-readable medium 822 is shown in an example embodiment to be a single medium, the term "machine-readable medium" should be taken to include a single medium or multiple media (e.g., a centralized or distributed database, or associated caches and servers) able to store the instructions 824. The term "machine-readable medium" shall also be taken to include any medium that is capable of storing instructions 824 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
accessing a checksum tree for a secondary data store, the checksum tree comprising a hierarchy of checksums for a plurality of data blocks stored at the secondary data store, each data block containing a set of data having a unique specified set of properties, the unique specified set of properties determined based on data parameters organizing the plurality of data blocks;
receiving, from a client device, a data request for one or more data blocks of the plurality of data blocks;
identifying a reference subtree within the checksum tree for the one or more requested data blocks, wherein the reference subtree includes one or more leaf nodes that store checksums for one or more data blocks at the secondary data store that correspond to the one or more requested data blocks;
retrieving one or more data blocks from a primary data store that correspond to the one or more requested data blocks;

organizing the retrieved one or more data blocks from the primary data store based on the data parameters of the retrieved one or more data blocks;

generating a comparison subtree based on the organized one or more data blocks from the primary data store, the comparison subtree comprising nodes that correspond to nodes in the reference subtree;

comparing the comparison subtree to the reference subtree; and determining whether the one or more data blocks from the primary data store match the one or more data blocks stored at the secondary data store based on the comparison of the comparison subtree and the reference subtree.

2. The method of claim 1, further comprising: responsive to determining that the one or more data blocks retrieved from the primary data store match the one or more data blocks from the secondary data store, transmitting the one or more data blocks from the primary data store to the client device.

3. The method of claim 1, further comprising: responsive to determining that the one or more data blocks retrieved from the primary data store do not match the one or more data blocks from the secondary data store, identifying one or more of the retrieved data blocks as inaccurate based on checksums stored in the comparison subtree.

4. The method of claim 3, wherein identifying one or more of the retrieved data blocks as inaccurate comprises: traversing the comparison subtree from a root node to identify a leaf node of the comparison subtree with a checksum that does not match a checksum in a corresponding leaf node of the reference subtree.

5. The method of claim 1, wherein comparing the comparison subtree to the reference subtree comprises: comparing a root node of the comparison subtree to a root node of the reference subtree.

6. The method of claim 5, wherein determining whether the one or more data blocks retrieved from the primary data store are accurate comprises: determining whether a checksum of the comparison subtree root node is equal to a checksum of the reference subtree root node.

7. The method of claim 1, wherein the reference subtree is one of a common ancestor subtree for the one or more leaf nodes or an exclusive subtree for the one or more leaf nodes, the common ancestor subtree being a subtree with a root node that is a lowest ancestor of the one or more leaf nodes, and the exclusive subtree being a subtree with leaf nodes that consist of the one or more leaf nodes.

8. The method of claim 1, wherein generating the comparison subtree comprises: calculating checksums for one or more leaf nodes based on the one or more data blocks retrieved from the primary data store.

9. The method of claim 1, wherein generating the comparison subtree comprises: calculating checksums for a parent node based on a checksum of a child node associated with the parent node.

10. The method of claim 9, wherein the data request includes a range of a parameter used by the primary data store to organize the plurality of data blocks.

11. A non-transitory computer-readable medium comprising computer-executable instructions that, when executed by a processor, cause the processor to:

access a checksum tree for a secondary data store, the checksum tree comprising a hierarchy of checksums for a plurality of data blocks stored at the secondary data store, each data block containing a set of data having a unique specified set of properties, the unique specified set of properties determined based on data parameters organizing the plurality of data blocks;

receive, from a client device, a data request for one or more data blocks of the plurality of data blocks;

identify a reference subtree within the checksum tree for the one or more requested data blocks, wherein the reference subtree includes one or more leaf nodes that store checksums for the one or more requested data blocks at the secondary data store that correspond to the one or more requested data blocks;

retrieve one or more data blocks from a primary data store that correspond to the one or more requested data blocks;

organize the retrieved one or more data blocks from the primary data store based on the data parameters of the retrieved one or more data blocks;

generate a comparison subtree based on the organized one or more data blocks from the primary data store, the comparison subtree comprising nodes that correspond to nodes in the reference subtree;

compare the comparison subtree to the reference subtree; and determine whether the one or more data blocks from the primary data store match the one or more data blocks stored at the secondary data store based on the comparison of the comparison subtree and the reference subtree.

12. The computer-readable medium of claim 11, wherein the instructions cause the processor to: responsive to determining that the one or more data blocks retrieved from the primary data store match the one or more data blocks from the secondary data store, transmit the one or more data blocks to the client device.

13. The computer-readable medium of claim 11, wherein the instructions cause the processor to: responsive to determining that the one or more data blocks retrieved from the primary data store do not match the one or more data blocks from the secondary data store, identify one or more of the retrieved data blocks as inaccurate based on checksums stored in the comparison subtree.

14. The computer-readable medium of claim 13, wherein the instructions for identifying one or more of the retrieved data blocks as inaccurate cause the processor to: traverse the comparison subtree from a root node to identify a leaf node of the comparison subtree with a checksum that does not match a checksum in a corresponding leaf node of the reference subtree.

15. The computer-readable medium of claim 11, wherein the instructions for comparing the comparison subtree to the reference subtree cause the processor to: comparing a root node of the comparison subtree to a root node of the reference subtree.

16. The computer-readable medium of claim 15, wherein the instructions for determining whether the one or more data blocks retrieved from the primary data store are accurate cause the processor to: determine whether a checksum of the comparison subtree root node is equal to a checksum of the reference subtree root node.

17. The computer-readable medium of claim 11, wherein the reference subtree is one of a common ancestor subtree for the one or more leaf nodes or an exclusive subtree for the one or more leaf nodes, the common ancestor subtree being a subtree with a root node that is a lowest ancestor of the one or more leaf nodes, and the exclusive subtree being a subtree with leaf nodes that consist of the one or more leaf nodes.

18. The computer-readable medium of claim 11, wherein the instructions for generating the comparison subtree cause the processor to: calculate checksums for one or more leaf nodes based on the one or more data blocks retrieved from the primary data store.

19. The computer-readable medium of claim 11, wherein the instructions for generating the comparison subtree cause the processor to: calculate checksums for a parent node based on a checksum of a child node associated with the parent node.

20. The computer-readable medium of claim 19, wherein the data request includes a range of a parameter used by the primary data store to organize the plurality of data blocks.

* * * * *